United States Patent
Tatemi

(10) Patent No.: US 6,273,698 B1
(45) Date of Patent: Aug. 14, 2001

(54) TIRE VULCANIZING SYSTEM

(75) Inventor: Hiroki Tatemi, Nagasaki (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 0 days.

(21) Appl. No.: 09/483,052

(22) Filed: Jan. 13, 2000

(30) Foreign Application Priority Data

Jan. 13, 1999 (JP) .................................................. 11-006207

(51) Int. Cl.[7] .................................................. B29C 35/02
(52) U.S. Cl. .................................. 425/29; 425/48; 425/58; 425/193
(58) Field of Search .................................. 425/29, 48, 58, 425/193

(56) References Cited

U.S. PATENT DOCUMENTS 5,314,648 * 5/1994 Ichikawa et al. ..................... 425/29
5,776,507 * 7/1998 Ureshino et al. ..................... 425/29

FOREIGN PATENT DOCUMENTS 0 685 321   12/1995 (EP) .
7-112440    5/1995 (JP) .

* cited by examiner

Primary Examiner—James P. Mackey
(74) Attorney, Agent, or Firm—Alston & Bird LLP

(57) ABSTRACT

The present invention provides a tire vulcanizing system of a type such that a mold assembly in which tire vulcanization is being carried out is transported to a mold opening/closing station, which is equipped with a central mechanism for operating a bladder, the central mechanism being configured so that a plurality of claws are provided which attach and detach a post cylinder of a central mechanism driving section incorporated in the mold opening/closing station to and from a center post of a central mechanism operating section incorporated in the mold assembly, a sensor for detecting the decrease in pitch circle diameter of the claws is provided, expanding/contracting means for the claws is incorporated in the central mechanism driving section, and the sensor is assembled to the expanding/contracting means.

2 Claims, 4 Drawing Sheets

TIRE VULCANIZING SYSTEM

BACKGROUND OF THE INVENTION AND RELATED ART STATEMENT

1. Field of the Invention

The present invention relates to a tire vulcanizing system of a type such that a mold assembly in which tire vulcanization is being carried out is transported. More particularly, it relates to a tire vulcanizing system that is equipped with a central mechanism for operating a bladder.

2. Description of Related Art

In the conventional tire vulcanizing system, a central mechanism, which inserts and removes a bladder into and from a tire when the tire is loaded into and unloaded from a mold, is provided at the lower part In a tire vulcanizer body. The bladder is used during the tire vulcanization by being inserted in the tire.

The tire vulcanizing system of this type has a vulcanizing station at which a plurality of mold assemblies in which a tire is being vulcanized are arranged and vulcanization is continued and a mold opening/closing station at which a tire is loaded and unloaded into and from the mold assembly. The mold assembly is transported between the vulcanizing station and the mold opening/closing station. Also, the central mechanism is divided into an operating section for inserting and removing the bladder and a driving section for driving the operating section. The operating section is incorporated in the central part of the mold assembly, and the driving section is incorporated in the lower part of the mold opening/closing station. This art has already been proposed by the applicant of this invention (Japanese Patent Provisional Publication No. 7-112440 (No. 1124420/1995)).

However, in the art disclosed in the aforementioned Japanese Patent Provisional Publication No. 7-112440, a lever formed with a claw is used to attach and detach the operating section to and from the driving section, and the operation state of the lever is detected by a sensor. Such an art requires a space for installing the sensor. Further, since a heating/pressurizing medium (warm water, steam, or a mixture of steam and inert gas) supplied into the tire via the bladder at the time of tire vulcanization has a temperature of about 200° C., the operating section of the central mechanism also has a temperature of about 200° C. Therefore, when the lever portion of the driving section advances to the high-temperature operating section each time the tire is loaded and unloaded, the sensor is subjected to high temperatures, so that an expensive sensor having a high heat resistance must be used, which still presents a problem of increased cost.

OBJECT AND SUMMARY OF THE INVENTION

The present invention has been made in view of the above situation, and accordingly an object thereof is to provide a tire vulcanizing system equipped with an inexpensive and highly reliable central mechanism.

To solve the problems with the related art, the present invention provides a tire vulcanizing system of a type such that a mold assembly in which tire vulcanization is being carried out is transported to a mold opening/closing station, which is equipped with a central mechanism for operating a bladder, the central mechanism being configured so that a plurality of claws are provided which attach and detach a post cylinder of a central mechanism driving section incorporated in the mold opening/closing station to and from a center post of a central mechanism operating section incorporated in the mold assembly, a sensor for detecting the decrease in pitch circle diameter of the claws is provided, expanding/contracting means for the claws is incorporated in the central mechanism driving section, and the sensor is assembled to the expanding/contracting means.

As described above, the tire vulcanizing system in accordance with the present invention is of a type such that a mold assembly in which tire vulcanization is being carried out is transported to a mold opening/closing station, and is equipped with a central mechanism for operating a bladder. The central mechanism is configured so that a plurality of claws are provided which attach and detach a post cylinder of a central mechanism driving section incorporated in the mold opening/closing station to and from a center post of a central mechanism operating section incorporated in the mold assembly, a sensor for detecting the decrease in pitch circle diameter of the claws is provided, expanding/contracting means for the claws is incorporated in the central mechanism driving section, and the sensor is assembled to the expanding/contracting means. Therefore, the sensor is not subjected to high temperatures, and the central mechanism operating section and the central mechanism driving section can be connected to each other securely, so that the cost can be reduced and the reliability can be enhanced as compared with the conventional tire vulcanizing system.

DETAILED DESCRIPTION OF PREFERRED EMBODIMENTS

Figure 1:
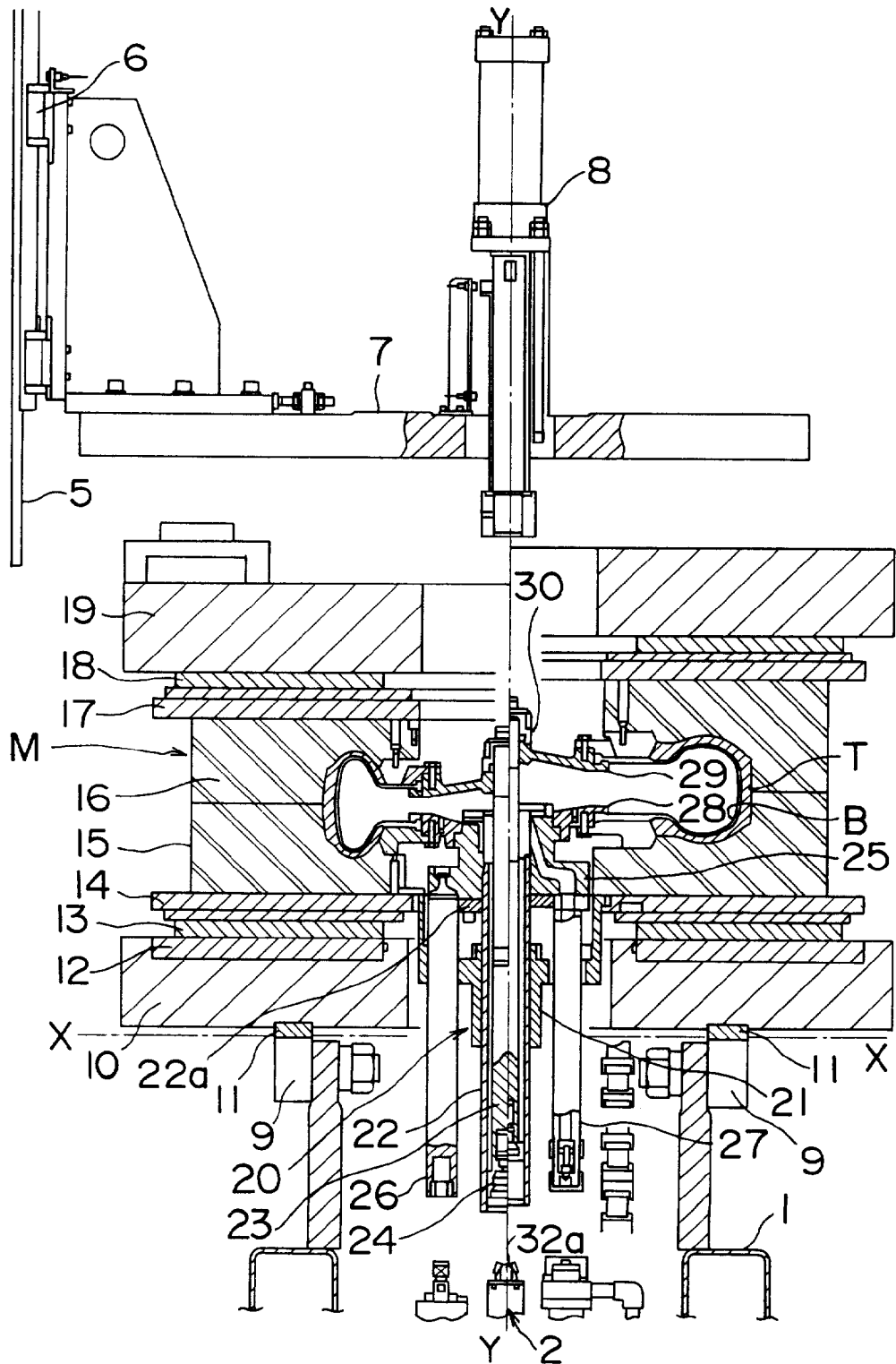
FIG. 1 is a sectional view including a mold centerline (vertical line) in a state in which a mold assembly has been carried into a mold opening/closing station of a tire vulcanizing system in accordance with an embodiment of the present invention.
Figure 3:
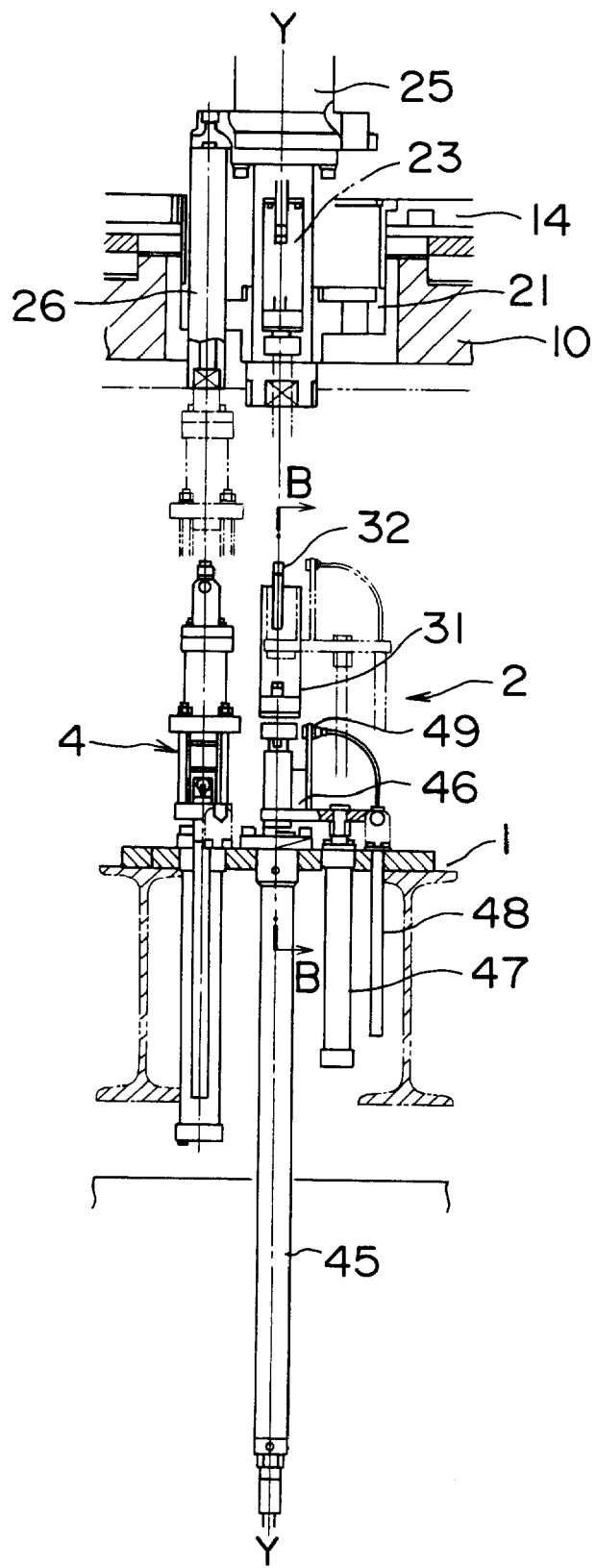
FIG. 3 is a sectional view taken along the line A—A of FIG. 2.
Figure 4:
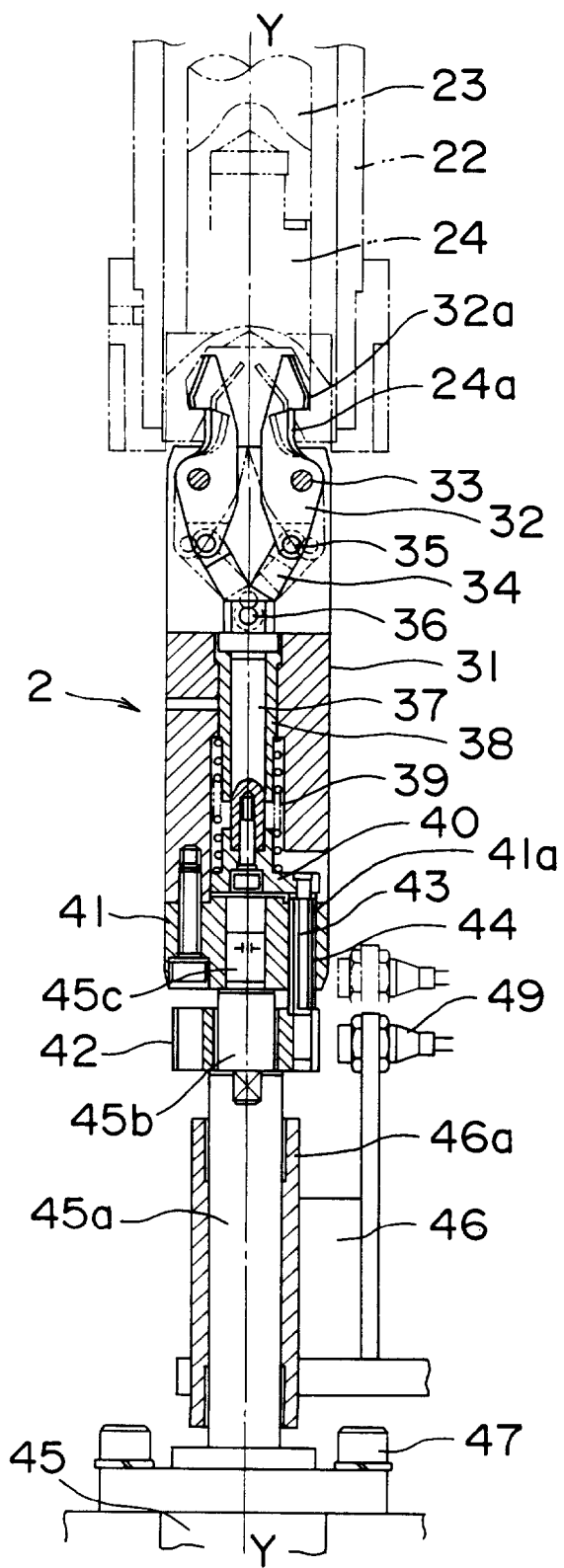
FIG. 4 is an enlarged sectional view taken along the line B—B of FIG. 3.

The present invention will now be described in detail with reference to an embodiment shown in the accompanying drawings. FIG. 1 is a sectional view including a mold centerline (vertical line) in a state in which a mold assembly has been carried into a mold opening/closing station of a tire vulcanizing system in accordance with an embodiment of the present invention, FIG. 2 is a sectional view showing a central mechanism of the tire vulcanizing system shown in FIG. 1, FIG. 3 is a sectional view taken along the line A—A of FIG. 2, and FIG. 4 is an enlarged sectional view taken along the line B—B of FIG. 3.

Figure 2:
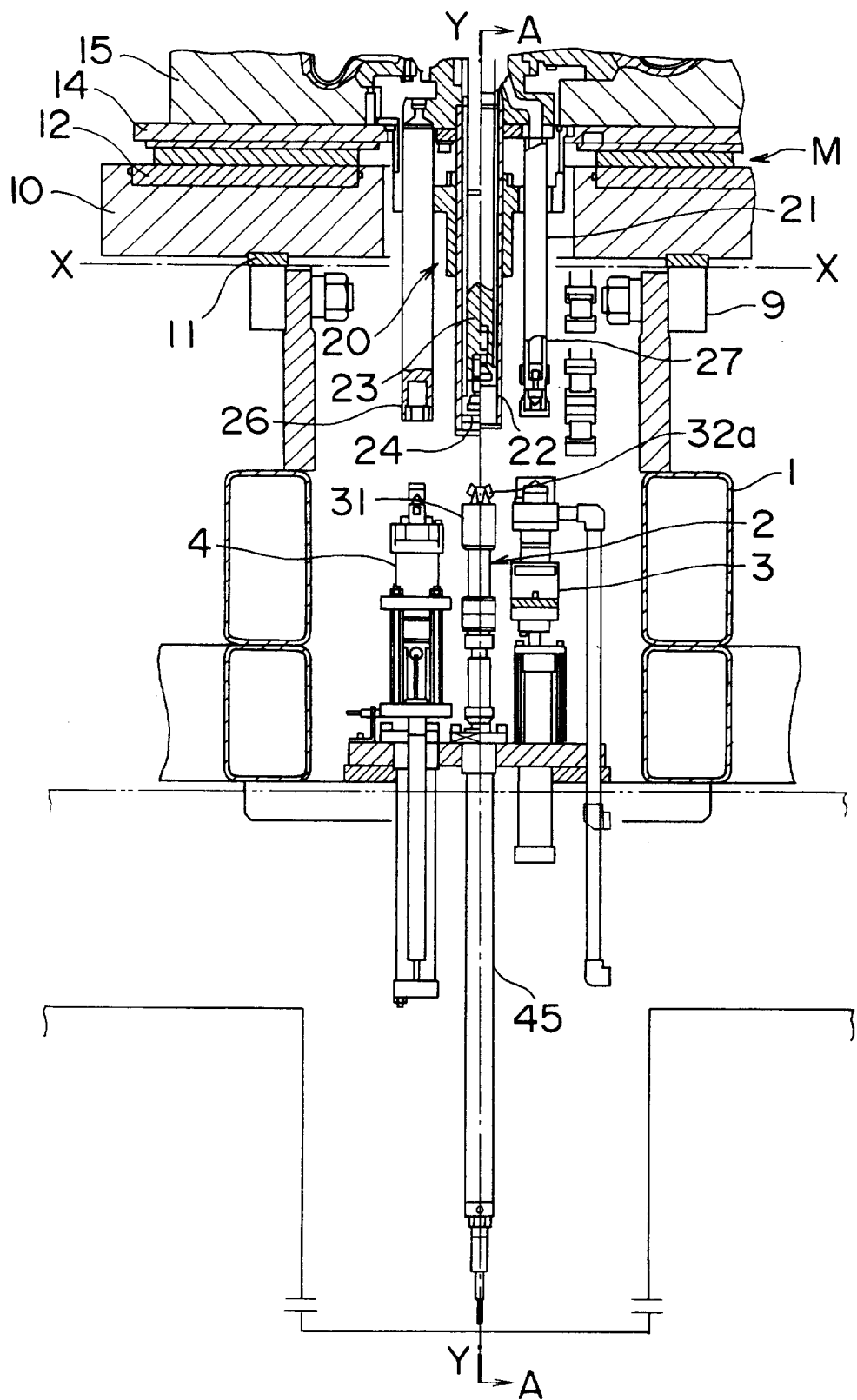
FIG. 2 is a sectional view showing a central mechanism of the tire vulcanizing system shown in FIG. 1.

Referring now to FIGS. 1 and 2, reference character M denotes a mold assembly which is carried into the mold opening/closing station after tire vulcanization. The left-hand side from the vertical centerline Y—Y of the mold assembly M shows a case where a tire of a small size is inserted, and the right-hand side shows a case where a tire of a large size is inserted. The X—X line indicates a movement guide face for the mold assembly M.

A central mechanism driving section 2, described later in detail, is fixed to a base 1 of the mold opening/closing station. In the vicinity of the central mechanism driving section 2, a well-known pipe attaching/detaching device 3 for a heating/pressurizing medium supplied into a tire T via a bladder B and a well-known driving unit 4 for bead lift are disposed. On the base 1 is erected pillars 5 of the mold opening/closing station, and a bolster plate 7 Is assembled to the pillars 5 by means of guide devices 6 so as to be capable of being moved vertically. To the bolster plate 7 is assembled a tread mold opening/closing means 8, which is used when a mold incorporated in the mold assembly M is of a type such that a tread mold, normally called a sectional mold, is divided into a plurality of pieces in the circumferential direction. Further, on the base 1 is rotatably assembled a plurality of guide rollers 9 for transporting the mold assembly M. In addition, this tire vulcanizing system includes a tire vulcanizing station (not shown), a transporter for the mold assembly M, a control unit, and the like.

As shown in FIGS. 1 and 2, the mold assembly M comprises a base plate 10 disposed on the lower side, rails 11 fixed on the lower surface of the base plate 10, a piston 12 of a pressurizing cylinder incorporated in the base plate 10, a lower heating plate 14 bolted to the piston 12 via an insulating plate 13, a lower mold 15 bolted to the lower heating plate 14, a top plate 19 disposed on the upper side, an upper heating plate 17 bolted to the top plate 19 via an insulating plate 18, an upper mold 16 bolted to the upper heating plate 17, a plurality of tie rods (not shown) for detachably connecting the base plate 10 and the top plate 19 to each other, and a central mechanism operating section 20 assembled at the inner periphery of the lower heating plate 14 to insert and remove the bladder B into and from the inside of the tire T by holding the end portion of the bladder B. The upper and lower molds 16 and 15 incorporated in the mold assembly M shown in FIGS. 1 and 2 are normally-called two-piece molds, each of which is divided into two pieces. They each can also be formed of the sectional mold.

The central mechanism operating section 20 comprises an outer cylinder 21 hung from the lower heating plate 14, an inner cylinder 22 inserted In the inner periphery of the outer cylinder 21 so as to be slidable vertically, a center post 23 inserted in the inside of the inner cylinder 22 so as to be slidable vertically, a block 24 fixed threadedly at the lower end portion of the center post 23, a nozzle member 25 bolted to a flange 22a formed on the outside at the upper end of the inner cylinder 22, a spacer rod 26 fixed on the lower face of the nozzle member 25 and a heating/pressurizing medium introducing pipe 27, a lower flange 28 fixed on the upper face side of the nozzle member 25, an upper flange 29 for holding an upper end opening of the bladder B, and a mounting member 30 for connecting the top of the center post 23 to the upper flange 29.

On the other hand, the central mechanism driving section mainly comprises, as shown in FIGS. 2 and 4, a center post cylinder 45 for vertically moving the center post 23, a plurality of levers 32 one end of which is provided with a claw 32a for attaching and detaching the center post cylinder 45 to and from the center post 23, a cylinder 47 for increasing and decreasing the pitch circle diameter of the claws 32a, a sensor 49 for detecting the diameter increasing/decreasing state of the claws 32a, and parts for connecting these elements. The following is a detailed description of these components.

A cylindrical spring case 31 is disposed on the side of a tip end portion 45c of a piston rod 45a of the center post cylinder 45. In this spring case 31, the lever 32 is incorporated via a pin 33 so as to be swung freely. At one end of the lever 32 is provided the claw 32a which engages with the upper face of a flange 24a of the block 24 connected to the center post 23 when the claws 32a are expanded. The flange 24a is an integrally formed part projecting to the inside from the lower end of the block 24.

The other end of the lever 32 is connected to a shaft 37 via pins 35 and 36 and a link 34. The shaft 37 is inserted in a sleeve 38 inserted and fixed in the spring case 31 so as to be slidable vertically. Further, a compression spring 39 is provided between a spring receiver 40 bolted to the shaft 37 and the spring case 31. Therefore, when an external force is not applied to the spring receiver 40, the shaft 37 is pushed down relatively with respect to the spring case 31 by a compression reactive force of the compression spring 39, so that the claws 32a are expanded.

When the spring case 31 is raised with respect to the center post 23 in this state, the back face of the claw 32a and the inner periphery of the flange 24a slide, and the shaft 37 is pulled up via the link 34, so that the compression spring 39 is compressed against the spring force. After the claws 32a are once contracted and advance into the block 24, the claws 32a can be expanded by the compression reactive force of the compression spring 39. Moreover, the claw 32a has a shape and size such that even if the spring case 31 is slowered, the expanded claws 32 are not contracted, and maintain the engagement with the upper face of the flange 24a.

The center post cylinder 45 is fixed to the base 1 of the mold opening/closing station, and a tip end member 41 is threadedly fixed to the tip end portion 45c of the piston rod 45a of the center post cylinder 45. The tip end member 41 is fixed to the spring case 31 with bolts, and in the case where it is connected to the center post 23, the center post 23 is moved vertically by the operation of the center post cylinder 45.

Also, on the small-diameter portion 45b at the upper end of the piston rod 45a is fitted a flange 42 so as to be slidable vertically. The flange 42 is fixed to the spring receiver 40 with bolts 43 by interposing a spacer 44 slidably inserted in a hole 41a formed in the tip end member 41.

Further, a sleeve 46a is fitted on the piston rod 45a so as to be slidable vertically and is integrated with a bracket 46. The bracket 46 is connected with the upper end of a piston rod of the cylinder 47 fixed to the base 1 of the mold opening/closing station, and also is connected with the upper end of a guide rod 48 inserted in the base 1 so as to be slidable vertically, so that the bracket 46 is moved vertically by the operation of the cylinder 47. The sensor (a proximity switch in this embodiment) 49 is assembled to the bracket 46, which sensor is set so as to detect a relative height of the spring case 31 with respect to the bracket 46 when the bracket 46 is raised to push up the flange 42 by coming into contact with the lower face of the flange 42 and pushes up the shaft 37 via the spring receiver 40 so that the claws 32a are contracted.

The center post cylinder 45 preferably has an encoder for detecting the position of a piston (not shown).

The following is a description of the operation of the central mechanism of the tire vulcanizing system in accordance with this embodiment. Of the plurality of mold assemblies M, the mold assembly M in which the tire vulcanization is finished Is transported to the mold opening/closing station. At the mold opening/closing station, after the mold assembly is locked to the base 1 by means of a device (not shown), the pipe attaching/detaching device 3 is raised and connected to the heating/pressurizing medium introducing pipe 27, by which a heating/pressurizing medium having been supplied into the tire T via the bladder B is discharged. Also, after the piston rod of the cylinder 47 is raised to contract the claws 32a, the piston rod 45a of the center post cylinder 45 is raised to insert the claws 32a into the block 24.

The configuration may be such that the piston rod of the cylinder 47 is lowered so that the claws 32a are expanded and connected to the center post 23 at the time when the insertion of the claws 32a is completed.

After the heating/pressurizing medium in the tire T has been discharged, the bolster plate 7 is raised and also the upper mold 16 is raised to open the mold assembly M. During this time, the driving unit 4 for bead lift is raised and connected to the spacer rod 26.

When the mold assembly M has been opened, after being retreated to a position where the tire T can be inserted and removed without hindrance, if necessary, the central mechanism operating section 20 is raised by the operation of the driving unit 4 for bead lift to peel the tire T off the lower mold 15.

Then, the interior of the bladder B is caused to have a negative pressure, and the piston rod 45a of the center post cylinder 45 is raised to separate the lower flange 28 and the upper flange 29, which hold the end portions of the bladder B, from each other, by which the bladder B is expanded and pulled out of the tire T. Thereafter, the vulcanized tire T is lifted and removed from the mold assembly M by means of an unloader (not shown). Then, after the central mechanism operating section 20 is lowered, a green tire T to be vulcanized next Is loaded into the mold assembly M by means of a loader (not shown). After the claws 32a are temporarily inserted in the block 24, even in the case where the claws 32a are not expanded by the operation of the cylinder 47, the bracket 46 is separated from the spring case 31 by the rise of the piston rod 45a, by which the claws 32a are expanded so that the piston rod 45a is connected to the center post 23.

After the loading of the tire T is finished, while steam or inert gas with a minute pressure (normally called a hold pressure) is supplied into the bladder B, the center post cylinder 45 is operated reversely to bring the flanges 28 and 29, which hold the end portions of the bladder B, close to each other so as to have the same clearance as the bead clearance of the green tire T, by which the bladder B is inserted into the tire T and is expanded.

After the insertion of the bladder B is finished, the upper mold 16 of the mold assembly M is closed until the inner peripheral portion thereof comes into contact with the tire T. Succeedingly, the pressure in the bladder B is increased to a low pressure (normally called a shaping pressure), by which a well-known shaping operation is carried out while the mold assembly is closed. During this time, the piston rod 45a of the center post cylinder 45 is pushed down and lowered by the upper mold 16 via the upper flange 29.

After the mold assembly M has been closed, the top plate 19 and the base plate 10 are locked by means of the aforementioned not illustrated tie rods, and then mold clamping is performed by means of a pressurizing cylinder in the base plate 10 of the mold assembly M. Thereafter, a high-pressure high-temperature heating/pressurizing medium is supplied into the tire T via the bladder B, whereby the vulcanizing process is started.

After the vulcanizing process is started, the pipe attaching/detaching device 3 and the driving unit 4 for bead lift are lowered. Then, after the piston rod of the cylinder 47 is once raised to contract the claws 32a, if necessary, the piston rod 45a of the center post cylinder 45 is lowered to separate the central mechanism driving section 2 from the center post 23. Subsequently, the mold assembly M is transported to the vulcanizing station, and the mold assembly M from which the tire T is to be removed next is transported to the mold opening/closing station, where the same operation is carried out.

As is apparent from the above description, in the tire vulcanizing system in accordance with the embodiment of the present invention, a force applied to the center post 23 to pull up the center post 23 is only a force created by the minute pressure supplied into the bladder B when the bladder B is inserted into the tire T, and all other forces are ones that push down the center post 23. Therefore, this pushdown force is transmitted to the piston rod 45a of the center post cylinder 45 by the contact between the lower face of the block 24 and the upper face of the spring case 31, and the dimension is determined at this time so that a slight gap is produced between the engaging faces of the block 24 an the claw 32a. By doing this, when the bladder B is pulled out of the initial tire T, the claws 32a are expanded automatically by the compression reactive force of the compression spring 39, and when the force to pull up the center post 23 is applied, the connection between the center post 23 and the piston rod 45a of the center post cylinder 45 has already been finished securely.

Thus, in the central mechanism provided in the tire vulcanizing system in accordance with the embodiment of the present invention, the check for the operation of the lever 32, that is, the expansion/contraction of the claws 32a can be made without any trouble in practical use by only checking that the tire T has been unloaded and loaded and the claws 32a are contracted when the piston rod 45a of the center post cylinder 45 is separated from the center post 23. Paying attention to this fact, the sensor 49 is installed on the bracket 46 for expanding/contracting the claws 32a so that the position of the spring case 31 with respect to the bracket 46 at the time when the claws 32a are contracted is detected by the sensor 49. Therefore, the possibility of the sensor 49 advancing into the inner cylinder 22 of the central mechanism operating section 2, which becomes hot, or approaching the inner cylinder 22 is eliminated, so that a commercially available sensor, which is inexpensive as compared with the conventional one requiring heat resistance, can be used. Further, the stroke of the cylinder 47 may also be shortened as compared with the center post cylinder 45.

Also, in the central mechanism provided in the tire vulcanizing system in accordance with the embodiment of the present invention, the compression spring 39 is used in the central mechanism operating section 20 incorporated in the mold assembly M, and the claws 32a of the levers 32 are expanded by the compression reactive force of the compression spring 39, by which the central mechanism operating section 20 and the central mechanism driving section 2 can be connected securely to each other, which provides higher reliability than that of the conventional central mechanism.

The above is a description of the embodiment of the present invention. The present invention is not limited to the above-described embodiment, and various modifications and changes can be made on the basis of the technical concept of the present invention.

What is claimed is:

1. A tire vulcanizing system comprising a mold assembly in which tire vulcanization is carried out is adapted to be transported to a mold opening/closing station, and the mold assembly includes a central mechanism for operating a bladder, said central mechanism being configured so that a plurality of claws operatively associated with a post cylinder of a central mechanism driving section are adapted to attach and detach the post cylinder to and from a center post of a central mechanism operating section incorporated in said mold assembly, by radial expansion and contraction of said plurality of claws, a sensor for detecting a decrease in pitch circle diameter of said claws is provided, expanding/contracting apparatus for said claws is incorporated in said central mechanism driving section, and said sensor is operatively connected to said expanding/contracting apparatus.

2. The tire vulcanizing system according to claim 1, wherein said post cylinder is configured to vertically move said center post, a plurality of levers each of which is provided with one of said claws at one end thereof, a cylinder for increasing and decreasing the pitch circle diameter of said claws, and a cylindrical spring case is provided on the tip end side of a piston rod of said post cylinder and said sensor is installed on a bracket for expanding/contracting said claws, so that the position of said spring case with respect to said bracket at the time when said claws are contracted is detected by said sensor.

* * * * *